United States Patent
Waarts et al.

(10) Patent No.: US 7,203,428 B2
(45) Date of Patent: Apr. 10, 2007

(54) METHOD AND APPARATUS FOR POLARIZATION MODE DISPERSION MONITORING IN A MULTIPLE WAVELENGTH OPTICAL SYSTEM

(75) Inventors: Robert G. Waarts, Los Altos, CA (US); Russell Chipman, Tucson, AZ (US)

(73) Assignee: JDS Uniphase Corporation, Milpitas, CA (US)

( * ) Notice: Subject to any disclaimer, the term of this patent is extended or adjusted under 35 U.S.C. 154(b) by 695 days.

(21) Appl. No.: 10/458,070

(22) Filed: Jun. 10, 2003

(65) Prior Publication Data

US 2004/0008991 A1    Jan. 15, 2004

Related U.S. Application Data

(60) Provisional application No. 60/386,716, filed on Jun. 10, 2002.

(51) Int. Cl.
    *H04B 10/06* (2006.01)
(52) U.S. Cl. .................. 398/204; 398/202; 398/25; 398/29
(58) Field of Classification Search ........ 398/202–214, 398/25, 29
    See application file for complete search history.

(56) References Cited

U.S. PATENT DOCUMENTS

| | | | |
|---|---|---|---|
| 5,400,167 A * | 3/1995 | Suemura ................. | 398/209 |
| 5,822,100 A | 10/1998 | Robinson et al. ........ | 359/161 |
| 6,486,958 B1 * | 11/2002 | Szafraniec et al. ...... | 356/484 |
| 6,563,590 B2 * | 5/2003 | Chowdhury et al. ..... | 356/484 |
| 6,885,783 B2 * | 4/2005 | Bandemer et al. ....... | 385/11 |
| 7,085,501 B1 * | 8/2006 | Rickard et al. .......... | 398/202 |
| 2002/0140943 A1 | 10/2002 | Chowdhury et al. ..... | 356/484 |

FOREIGN PATENT DOCUMENTS

WO    WO 01/67649 A1    9/2001

* cited by examiner

*Primary Examiner*—Kenneth Vanderpuye
*Assistant Examiner*—Luis Garcia
(74) *Attorney, Agent, or Firm*—Allen, Dyer, Doppelt, Milbrath & Gilchrist, P.A.

(57) ABSTRACT

The invention relates to the monitoring of polarization mode dispersion (PMD) using heterodyne detection for providing PMD compensation in optical networks, and an apparatus for monitoring PMD. In the present invention, a broadband PMD monitor is disclosed based on heterodyne detection with a tunable laser source which can be fed to a compensator such as an add/drop or other wavelength switch and polarization dependent attenuation means. A signal from a local oscillator is combined with an optical signal and the beat frequency amplitude and phase is analyzed for two orthogonal polarization states simultaneously to obtain a state of polarization. By averaging a plurality of polarization states within a channel, PMD can be estimated for compensation.

12 Claims, 1 Drawing Sheet

METHOD AND APPARATUS FOR POLARIZATION MODE DISPERSION MONITORING IN A MULTIPLE WAVELENGTH OPTICAL SYSTEM

CROSS-REFERENCE TO RELATED APPLICATIONS

This application claims priority from U.S. provisional application No. 60/386,716 filed Jun. 10, 2002.

MICROFICHE APPENDIX

Not Applicable.

TECHNICAL FIELD

The present application relates to the method of monitoring polarization mode dispersion (PMD) using heterodyne detection for providing PMD compensation in optical networks, and an apparatus for monitoring PMD.

BACKGROUND OF THE INVENTION

As optical networks move to higher speed modulation, such as 10 or 40 Gb/s, PMD is recognized as a source of signal distortion and increased bit error rates which may result in system outages. PMD causes pulse broadening, eventually making individual data bits indistinguishable. PMD varies widely with wavelength, and therefore compensation at one wavelength may actually increase PMD at another wavelength. Therefore, PMD detection must be wavelength specific, and compensation must be channel specific.

Known compensators typically measure the distortion, for instance by measuring the degree of polarization (DOP) of a single channel and provide compensation for the single channel. Although this approach works well, it requires a complex compensator and monitor for each channel, resulting in high cost for the overall transmission system.

A simplified broad band PMD monitor is still highly desirable to make high speed transmission possible.

A broad band system for measuring state of polarization (SOP) is disclosed in U.S. patent application publication No. 2002/0140943 by Dipakbin Chowdhury et al. published Oct. 3, 2002. The system discloses a tunable local oscillator which is operatively connected to a polarization transformer for transforming the local optical signal to a selected one of a plurality of polarization states. The polarized local optical signal is then combined with the transmitted optical signal and directed to a heterodyne detector to detect the beat frequency for determining the SOP of the transmitted optical signal. For each selected wavelength of the tunable local oscillator, three different polarization states are measured, prior to scanning to a next selected wavelength. This process is both slow and complex, requiring two degrees of control to the local oscillator, wavelength and polarization state. The polarization controller is expensive and relatively slow. The slow response is compounded by the need to obtain sequentially measurement of three different polarization states for each wavelength.

SUMMARY OF THE INVENTION

In the present invention, a broadband PMD monitor is disclosed based on heterodyne detection with a tunable laser source which can be fed to a compensator such as an add/drop or other wavelength switch and polarization dependent attenuation means.

Accordingly, an object of the present invention is to provide a method of monitoring polarization mode dispersion (PMD) to determine a PMD of one or more channels within an optical link comprising the steps of:
a) providing a multiple wavelength optical signal comprising the one or more channels of defined wavelength bands;
b) combining a narrow line width optical signal from a local tunable source having a selected wavelength with the multiple wavelength optical signal;
c) splitting the combined narrow line width optical signal and the multiple wavelength optical signal into first and second beams of orthogonal polarization states such that optical power of the narrow line width optical signal is substantially equally divided;
d) detecting an amplitude and phase of the first beam at a predetermined beat frequency with a first heterodyne detector;
e) detecting an amplitude and phase of the second beam at the predetermined beat frequency with a second heterodyne detector;
h) comparing the detected amplitude and phase of the first and second heterodyne detectors to determine a state of polarization (SOP) for the selected wavelength;
i) tuning the narrow line width optical signal to another selected wavelength within a channel wavelength band;
j) repeating steps a-h for a plurality of other selected wavelengths;
k) determining the PMD for the channel wavelength band from the SOPs of the plurality of selected wavelengths.

In embodiments of the invention, a polarization mode dispersion (PMD) monitor comprises:
a local tunable optical source;
an optical beam combiner having a first input port for receiving a multiple wavelength optical signal, and a second input port for receiving a narrow line width optical signal at a selected wavelength from the tunable source, and an output port for outputting a combined light beam;
an optical splitter for dividing the light beam into two subbeams such that a polarization state of each of the two subbeams is orthogonal to the other, and that optical power of the narrow line width optical signal is substantially equally divided;
a first heterodyne detector for detecting amplitude and phase of a predetermined beat frequency of the first subbeam;
a second heterodyne detector for detecting amplitude and phase of the predetermined beat frequency of the second subbeam; and
a processor for comparing the detected amplitude and phase of each heterodyne detector to calculate a state of polarization (SOP) of the selected wavelength, and to store a plurality of calculated SOP values to determine the PMD of a predetermined wavelength band.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
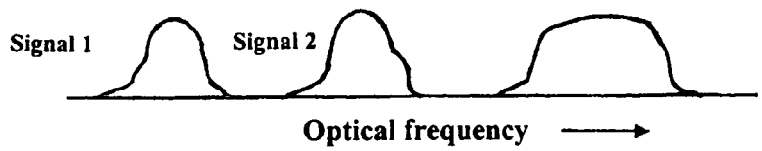
FIG. 1 is a schematic illustration of a distorted optical spectrum after transmission over a fiber transmission line.

PMD is characterized by a change in transmitted polarization state as function of frequency. FIG. 1 schematically shows a typical optical spectrum transmitted over a fiber transmission line. The spectrum represents the power of the signal in each frequency band (channel) at any state of polarization. In the presence of PMD, the state of polarization (SOP) in each frequency band varies widely. By sampling a signal band within narrow segments where the SOP does not vary substantially, the degree of polarization (DOP) can be calculated and the PMD predicted. Practically, measuring an average SOP and DOP across a channel gives a determination of PMD which can be compensated in a reasonable response time.

Figure 2:
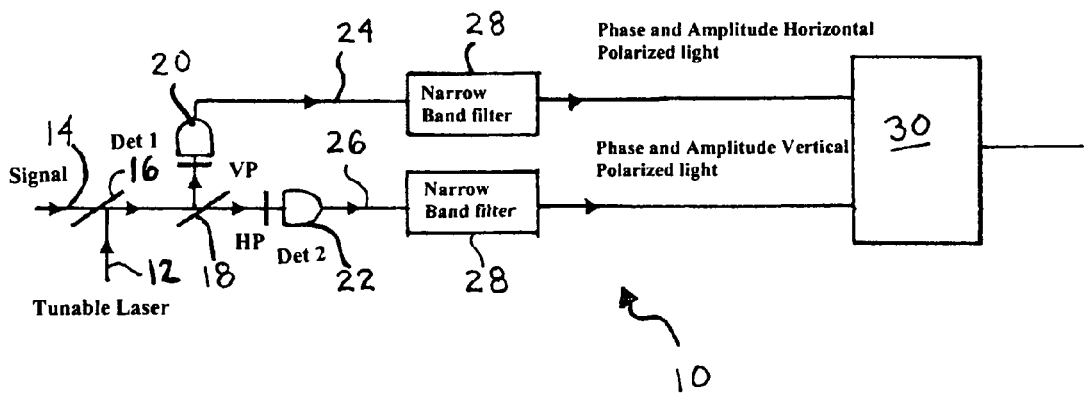
FIG. 2 is a schematic PMD monitor.

A very powerful and convenient method of measuring SOP as a function of optical frequency is by heterodyne detection of the signal. As illustrated in FIG. 2, a device 10 for measuring SOP as a function of wavelength mixes light from a local tunable laser 12 with the transmitted signal 14 at beam combiner 16. The tunable laser 12 having a narrow line width frequency that can be selectively varied, is scanned for example, over the full C band or more. The combined signal and tunable laser light is directed through a beam splitter 18 to two different detectors 20, 22. Each detector has a linear polarizing filter oriented such that each transmits light with orthogonal polarization. The narrow line width optical signal may be circularly polarized. Following the beam splitter 18, each detector 20, 22 receives light of orthogonal states. Alternatively, the beam splitter 18 can be a polarizing beam splitter which divides input signal light into orthogonal polarization states. If the tunable laser light 12 is linearly polarized with its polarization axis at 45 degrees with respect to the polarization beam splitter 18, it is split into substantially equal power in orthogonal linear states directed to each detector 20, 22. At each selected wavelength of the tunable laser 12, the detectors 20, 22 measure the power in the combined signal for each polarization state. The narrow line width frequency of the tunable laser 12 and the signal light mix in the photodetectors 20, 22 to provide a characteristic beat frequency electrical response. By passing the electrical response through matched narrow band pass filters 28 simultaneously, each having a pass band corresponding to a predetermined beat frequency, phase and amplitude information at the predetermined beat frequency for the two electrical responses corresponding to the two polarization states is obtained. From this information the state of polarization of a narrow frequency band around the selected wavelength of the tunable laser can be determined. By analyzing the SOP as a function of frequency in a computer processor 30, the PMD for a signal with certain optical bandwidth and center frequency can be estimated for controlling a PMD compensator. By making a plurality of SOP calculations within each channel wavelength band, characterization of the channel PMD can be made. By scanning the local oscillator 12 through the inter-channel frequencies, the signal noise can also be characterized. Using balanced heterodyne detection also extends the application of the present device to detecting ASE and measuring the signal to noise ratio under the signal.

In a fiber with PMD each frequency band sees a slightly different birefringence and as a result each frequency band sees a slightly different output polarization as well as a different delay time. Measuring the change in polarization with wavelength therefore is a measure of the delay of the different frequencies which in turn determines the PMD distortion of the signal.

The choice of center band and bandwidth of the electrical filter 28 determines the frequency resolution of the measured SOP, eg. twice the center frequency plus the bandwidth of the filter. For example, an optical channel with 25 GHz bandwidth, and a filter center frequency of 10 MHz and a frequency bandwidth of 5 MHz (a resolution of 25 MHz) provides 1000 resolution points for measuring SOP of the channel. The signal strength would also be reduced by a factor of 1000 as compared to the optical signal, however the tunable laser or local oscillator provides substantial heterodyne RF gain which may mitigate the optical losses. To further improve the signal to noise ratio the measured signal may be averaged. Alternatively, the tunable laser can be modulated at a very low frequency (100 Hz–1 KHz) and electronic phase lock detection can be used as a noise filter to improve the signal to noise ratio.

Figure 3:
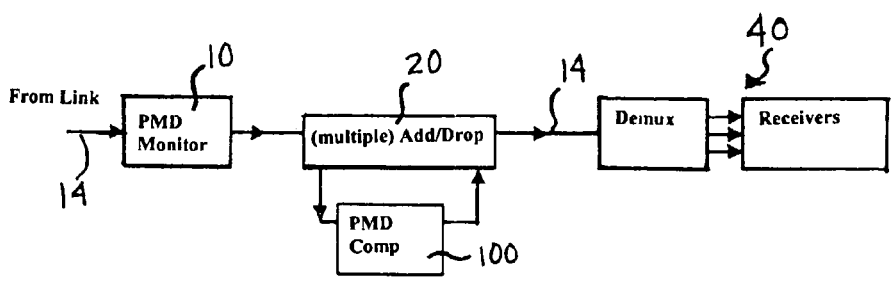
FIG. 3 is a schematic diagram of PMD compensation on demand in an optical link.

FIG. 3 schematically illustrates a method to compensate PMD on demand. The example as illustrated is a method for monitoring all channels or a selection of channels and using one or more add/drop demultiplexers to drop channels in need of compensation to a compensator and to recombine the amended signal. Optical signal 14 traveling on the optical link is input into the PMD monitor 10 as described with respect to FIG. 2. Individual channels measuring high PMD are routed by wavelength in an add/drop or other wavelength switch to a PMD compensator 100. Amended signals from the compensator 100 are recombined through the wavelength switch 20 with the remaining optical signals to continue on the link to a demultiplexing receiver 40.

Alternative compensators which provide continuous PMD compensation on demand for all channels without switching are attractive to avoid signal disruption.

The embodiment(s) of the invention described above is(are) intended to be exemplary only. The scope of the invention is therefore intended to be limited solely by the scope of the appended claims.

What is claimed is:

1. A method of monitoring polarization mode dispersion (PMD) to determine a PMD of one or more channels within an optical link comprising the steps of:
   a) providing a multiple wavelength optical signal comprising the one or more channels of defined wavelength bands;
   b) combining a narrow line width optical signal from a local tunable source having a selected wavelength with the multiple wavelength optical signal;
   c) splitting the combined narrow line width optical signal and the multiple wavelength optical signal into first and second beams of orthogonal polarization states such that optical power of the narrow line width optical signal is substantially equally divided;
   d) detecting an amplitude and phase of the first beam at a predetermined beat frequency with a first heterodyne detector;
   e) detecting an amplitude and phase of the second beam at the predetermined beat frequency with a second heterodyne detector;
   f) comparing the detected amplitude and phase of the first and second heterodyne detectors to determine a state of polarization (SOP) for the selected wavelength;

g) tuning the narrow line width optical signal to another selected wavelength within a channel wavelength band;

h) repeating steps a--f for a plurality of other selected wavelengths;

i) determining the PMD for the channel wavelength band from the SOBs of the plurality of selected wavelengths.

2. The method of monitoring PMD as defined in claim 1, wherein the local tunable source is continuously tunable over a frequency range at least as great as a bandwidth of the multiwavelength optical signal.

3. The method of monitoring PMD as defined in claim 1, wherein detecting the predetermined beat frequency amplitude and phase of the first and second beams with first and second heterodyne detectors comprises:

obtaining a first electrical signal indicative of amplitude of the first beam with a first photodetector;

obtaining a second electrical signal indicative of amplitude of the second beam with a second photodetector;

passing a first electrical signal from the first photodetector through a first narrow band filter to detect a signal at the beat frequency having amplitude and phase information; and passing a second electrical signal from the second photodetector through a second narrow band filter matched to the first narrow band filter, to detect a signal at the beat frequency having amplitude and phase information.

4. The method of monitoring PMD as defined in claim 3, further including the steps:

j) comparing the PMD for the channel wavelength band to a predetermined PMD threshold;

k) directing a channel wavelength band having a PMD which exceeds the predetermined threshold through a wavelength switch to a PMD compensator; and l) remultiplexing a compensated channel wavelength band from a PMD compensator through the wavelength switch into the multiple wavelength optical signal.

5. The method of monitoring PMD as defined in claim 1, wherein the local tunable source provides linearly polarized light oriented at 45 degrees to a polarizing beam splitter for splitting the combined signals.

6. The method of monitoring PMD as defined in claim 3, wherein the first and second narrow band filters have a center band selected to determine the resolution of SOP measurements within a channel wavelength band.

7. A method of monitoring polarization mode dispersion (PMD) to determine a PMD of one or more channels within an optical link comprising the steps of:

a) providing a multiple wavelength optical signal comprising the one or more channels of defined wavelength bands;

b) combining a narrow line width optical signal from a local tunable source having a selected wavelength with the multiple wavelength optical signal;

c) splitting the combined narrow line width optical signal and the multiple wavelength optical signal into first and second beams of orthogonal polarization states such that optical power of the narrow line width optical signal is substantially equally divided;

d) detecting an amplitude and phase of the first beam at a predetermined beat frequency with a first heterodyne detector;

e) detecting an amplitude and phase of the second beam at the predetermined beat frequency with a second heterodyne detector, wherein detecting the predetermined beat frequency amplitude and phase of the first and second beams with first and second heterodyne detectors comprises:

obtaining a first electrical signal indicative of amplitude of the first beam with a first photodetector;

obtaining a second electrical signal indicative of amplitude of the second beam with a second photodetector;

passing a first electrical signal from the first photodetector through a first narrow band filter to detect a signal at the beat frequency having amplitude and phase information; and passing a second electrical signal from the second photodetector through a second narrow band filter matched to the first narrow band filter, to detect a signal at the beat frequency having amplitude and phase information;

f) comparing the detected amplitude and phase of the first and second heterodyne detectors to determine a state of polarization (SOP) for the selected wavelength;

g) tuning the narrow line width optical signal to another selected wavelength within a channel wavelength band;

h) repeating steps a-f for a plurality of other selected wavelengths;

i) determining the PMD for the channel wavelength band from the SOPs of the plurality of selected wavelengths, further including the steps of modulating the narrow line width optical signal from the local tunable source at a predetermined modulation frequency and using phase lock detection to measure the amplitude and phase information of the first and second heterodyne detectors at the predetermined beat frequency.

8. The method of monitoring PMD as defined in claim 7, wherein the narrow line width optical signal is modulated at a frequency of 100 Hz–1 KHz.

9. A polarization mode dispersion (PMD) monitor comprising:

a local tunable optical source;

an optical beam combiner having a first input port for receiving a multiple wavelength optical signal, and a second input port for receiving a narrow line width optical signal at a selected wavelength from the tunable source, and an output port for outputting a combined light beam;

an optical splitter for dividing the light beam into two subbeams such that a polarization state of each of the two subbeams is orthogonal to the other, and that optical power of the narrow line width optical signal is substantially equally divided;

a first heterodyne detector for detecting amplitude and phase of a predetermined beat frequency of the first subbeam;

a second heterodyne detector for detecting amplitude and phase of the predetermined beat frequency of the second subbeam; and a processor for comparing the detected amplitude and phase of the first and the second heterodyne detector to calculate a state of polarization (SOP) of the selected wavelength, and to store a plurality of calculated SOP values to determine the PMD of a predetermined wavelength band.

10. A PMD monitor as defined in claim 9, wherein the first and second heterodyne detectors comprise a first and a second optical detector each for receiving one of the two subbeams and generating a detected electrical signal indicative of amplitude of the two subbeams; and a first and a second matched narrow band filter each for passing a filtered signal comprising a portion of the detected electrical signal from the first and second detectors comprising amplitude and phase of the predetermined beat frequency of the first and second subbeams.

11. A PMD monitor as defined in claim 10, further including wavelength switch controlled by the processor for selectively directing a channel wavelength band having a PMD which exceeds a predetermined threshold to a PMD compensator and for re-multiplexing a compensated channel wavelength band from a PMD compensator into the multiple wavelength optical signal.

12. The method of monitoring PMD as defined in claim 1, wherein the multiple wavelength optical signal includes inter-channel frequencies for characterizing the signal noise.

* * * * *

UNITED STATES PATENT AND TRADEMARK OFFICE
CERTIFICATE OF CORRECTION

PATENT NO. : 7,203,428 B2 Page 1 of 1
APPLICATION NO. : 10/458070
DATED : April 10, 2007
INVENTOR(S) : Waarts et al.

It is certified that error appears in the above-identified patent and that said Letters Patent is hereby corrected as shown below:

Col. 5, line 6, "SOBs" should read -- SOPs --

Signed and Sealed this

Twenty-seventh Day of November, 2007

JON W. DUDAS
*Director of the United States Patent and Trademark Office*